M. J. TRUMBLE.
GAS TRAP FLOAT.
APPLICATION FILED SEPT. 29, 1921.
1,432,221. Patented Oct. 17, 1922.
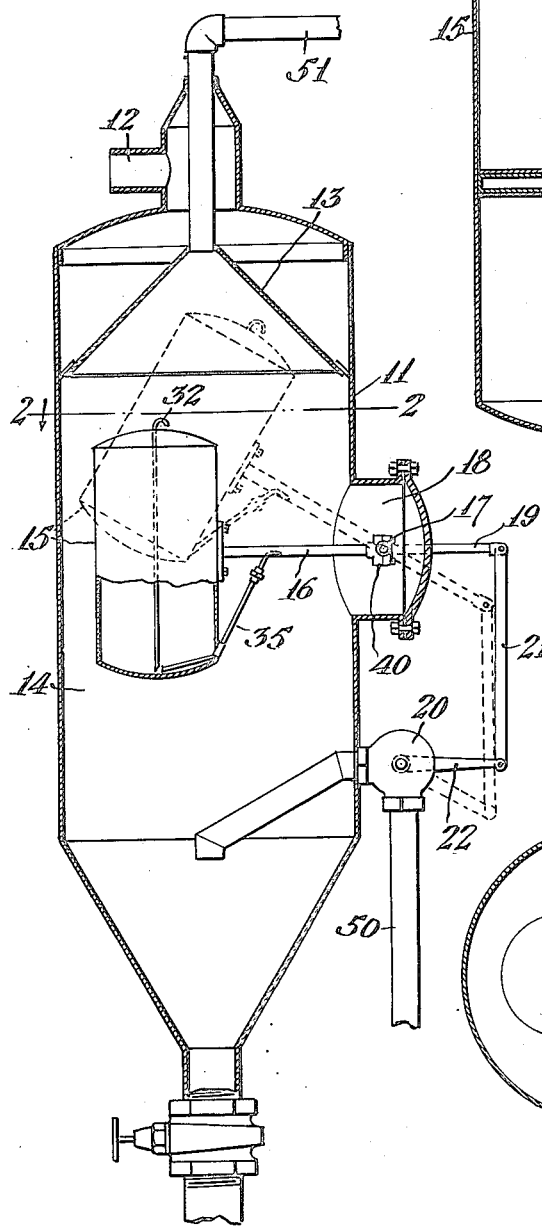
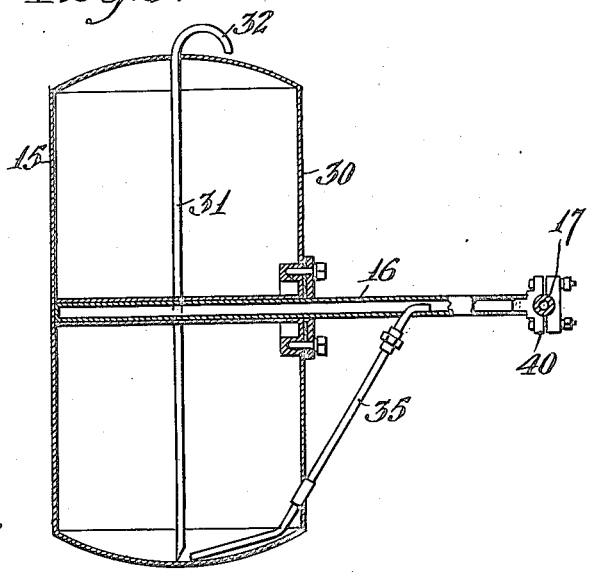
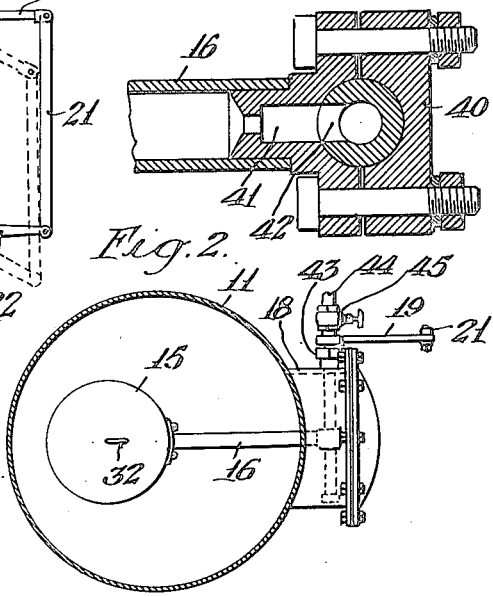
Inventor
Milton J. Trumble
by Graham + Harris
Attorneys Patented Oct. 17, 1922.

1,432,221

UNITED STATES PATENT OFFICE.

MILON J. TRUMBLE, OF ALHAMBRA, CALIFORNIA, ASSIGNOR TO TRUMBLE GAS TRAP COMPANY, A CORPORATION OF CALIFORNIA.

GAS-TRAP FLOAT.

Application filed September 29, 1921. Serial No. 504,030.

REISSUED

*To all whom it may concern:*

Be it known that I, MILON J. TRUMBLE, a citizen of the United States, residing at Alhambra, in the county of Los Angeles and State of California, have invented a new and useful Gas-Trap Float, of which the following is a specification.

This invention relates to oil producing equipment and particularly to the construction of gas traps for removing natural gas from the flow of oil from wells.

The pressure under which gas traps of this character are required to operate will during periods of surge reach 250 pounds, and it has been customary to construct such floats, as are used for controlling the operation of gas traps, of heavy material to resist collapse during the periods of high pressure. Also it is very difficult to form a light weight float that will remain impervious to the oil when being operated under high pressure conditions as the warping of the material of which the float is constructed, due to the great pressure to which it is subjected, causes seam openings which allow the entrance of oil into the float, the presence of which therein decreases the bouyancy of the float and prevents its giving efficient service.

It is an object of my invention to provide a float which cannot be collapsed by pressure existing within the interior of the gas trap in which it is used.

It is a further object of my invention to provide a float which may be readily cleared of any collection of liquid entering the float due to leakage or other causes.

Other objects and advantages will be made evident hereinafter.

Referring to the drawing which is for illustrative purposes only,

Fig. 1 is a vertical sectional view through a gas trap in which a float embodying my invention is shown.

Fig. 2 is a section taken on a plane represented by the line 2—2 of Fig. 1.

Fig. 3 is a vertical section through the float shown in Fig. 1.

Fig. 4 is an enlarged detail section illustrating the manner in which the float arm is secured to the exteriorly extending shaft supporting same.

The gas trap with which I illustrate the utility of my invention consists of a shell 11 into which oil and gas are delivered through an inlet 12, this oil and gas mixture flowing over a conical hood 13 and entering a receiving chamber 14 in which is situated a float 15 swingable upon an arm 16 which is secured to a hollow shaft 17 extending through the wall 18 so that an arm 19 may be mounted thereupon to actuate a valve 20 through a link 21 and a valve lever 22. The float 15 is composed of light sheet metal 30 and has extending axially therewithin and projecting through the top thereof a tube 31 which is of hook formation 32 at the upper end. This tube 31 furnishes guarded communication between the interior of the float and the interior of the gas trap and provides a means through which the external pressure may be transmitted to the interior of the float. I employ the term guarded to designate the manner in which the end 32 of the tube 31 is directed downwardly so that oil splashed over the top of the float 15 will not enter thereinto through the tube 31.

It will be seen that the condition of pressure upon the interior of the gas trap can have no collapsing effect upon the float as the pressure within the gas trap is communicated to the interior of the float through the tube 31.

There are times when the oil is delivered to the gas trap in the form of an emulsion and foam collects upon the surface of the oil in the trap, some times completely filling the space remaining above the oil level in which case some of the foam will pass through the tube 31 into the interior of the float. Also due to the presence of sand, the valve 20 might become inoperable with the float in its lowest position within the chamber 14. The level of oil then rising within the chamber 14 would submerge the float 15 due to its inability to rise therewith and oil would enter the float through the tube 31. Also a slight leakage in any of the seams of the float would permit a collection of oil within the interior of the float.

I provide a simple and expedient means of clearing the interior of the float 15 from all collections of oil by means of tubing 35 which leads from the bottom of the float and connects into the arm 16 which is of hollow construction. This arm 16 is secured to the shaft 17, as shown in Fig. 4, by means of a split block 40 which is drilled to provide a passage 41 to coincide with an opening 42 into the shaft 17. The shaft 17 extends through a suitable stuffing box 43 and has upon its outwardly extending end 44 a valve 45 which is kept normally closed. At certain designated times the valve 45 is opened to allow the pressure existing within the trap 11 to force whatever liquid is collected within the bottom of the float to be ejected through the tubing 35 and the passage provided by the float arm 16 and the hollow shaft 17. In this way the utmost buoyancy of the float is assured at all times as the float may be kept substantially free from interior collections of oil, the weight of which would detract from the effectiveness of action of the float in operating the valve 20.

Under normal operation of the trap the float 15 assumes the position shown in full lines, Fig. 1, in which position the valve 20 is partially open permitting a discharge of oil from the trap through pipe 50, the inner end of which extends downwardly into the trap. The gas from the oil collects under the cone 13 and is discharged from the trap through pipe 51. In the event a surge of oil is discharged into the trap through the pipe 12, the float will assume the dotted line position shown in Fig. 1 due to the rise of oil in the trap resulting in a greater opening of the valve 20 and a greater discharge of oil until the rate of flow of the incoming and outflowing oil has become equalized.

I claim as my invention:

1. In gas trap float mechanism, the combination of: walls providing a receiving chamber; a float arm within said chamber having communication with the exterior of said receiving chamber; a float mounted upon said arm; means associated with said float furnishing guarded communication between the interior of said float and the interior of said receiving chamber whereby the pressure existing in said receiving chamber is transmitted to the interior of said float; and valved means extending from said float to a point without said receiving chamber through which the interior of said float may be cleared of collected liquids.

2. Float mechanism for gas traps comprising: a hollow float arm within the trap having communication with the exterior of said trap; a float mounted upon said arm; means associated with said float furnishing guarded communication between the interior of said float and the interior of said trap whereby the pressure existing in said trap is transmitted to the interior of said float; and tubing connecting between the interior of said float and the interior of said arm whereby collected liquid may be ejected from the interior of said float by the pressure therein.

3. Float mechanism for gas traps comprising: a hollow float arm within the trap having communication with the exterior of said trap; a float mounted upon said arm; means associated with said float furnishing guarded communication between the interior of said float and the interior of said trap whereby the pressure existing in said trap is transmitted to the interior of said float; tubing connecting between the interior of said float and the interior of said arm whereby collected liquid may be ejected from the interior of said float by the pressure existing therein; and a valve to control the outflow of fluid from the interior of said float.

In testimony whereof, I have hereunto set my hand at Los Angeles, California, this 23rd day of September 1921.

MILON J. TRUMBLE.